Aug. 8, 1950   J. M. WHELTON ET AL   2,517,746
COATING APPARATUS FOR FILTER SECTIONS
Filed Feb. 4, 1946   4 Sheets-Sheet 1
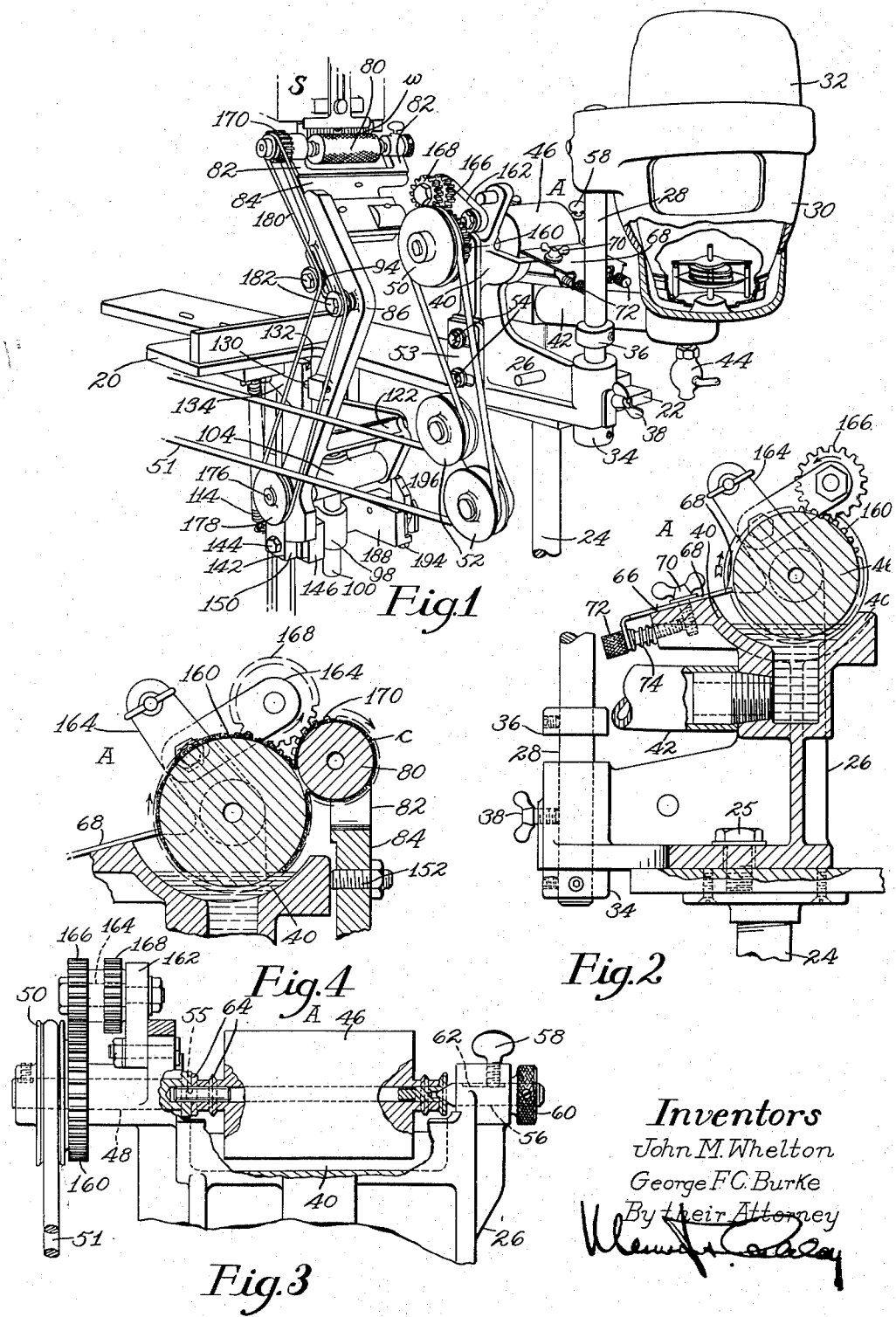
Inventors
John M. Whelton
George F. C. Burke
By their Attorney

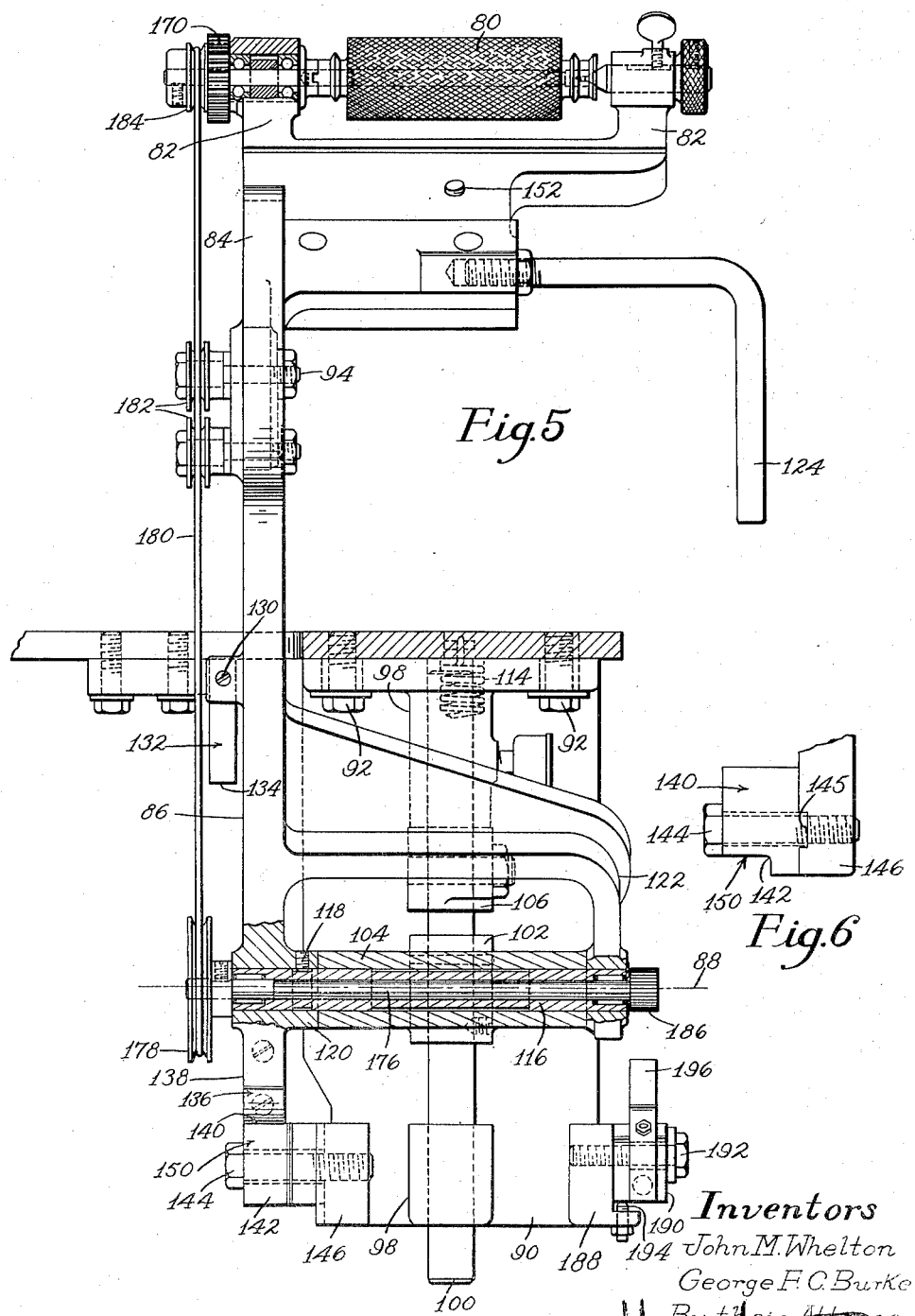

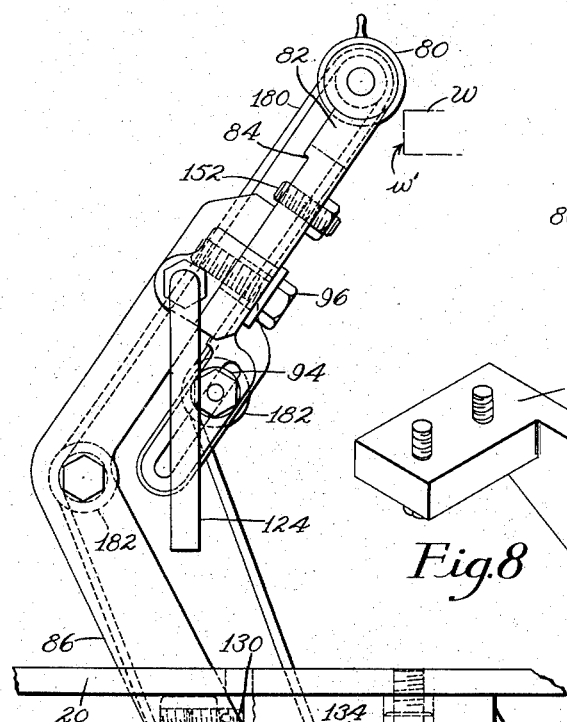

Aug. 8, 1950     J. M. WHELTON ET AL     2,517,746
COATING APPARATUS FOR FILTER SECTIONS
Filed Feb. 4, 1946                     4 Sheets-Sheet 4
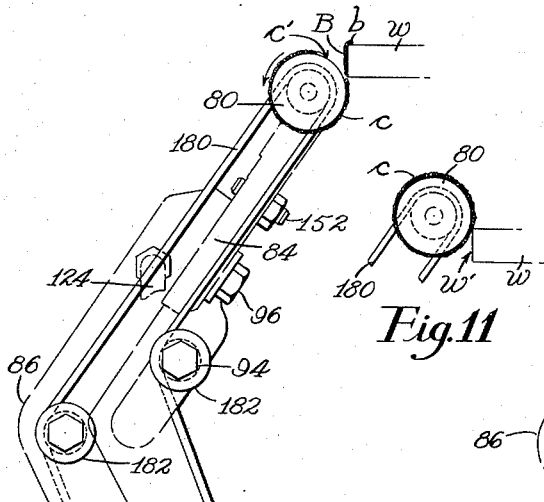
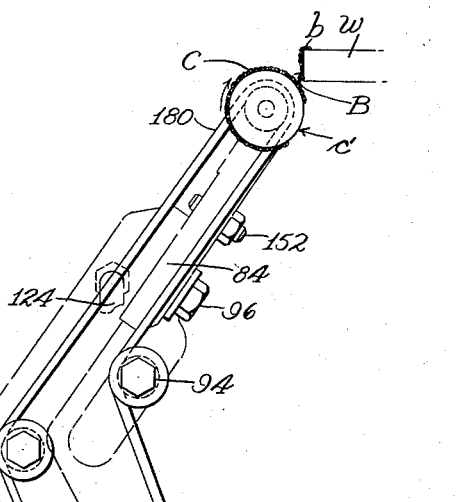
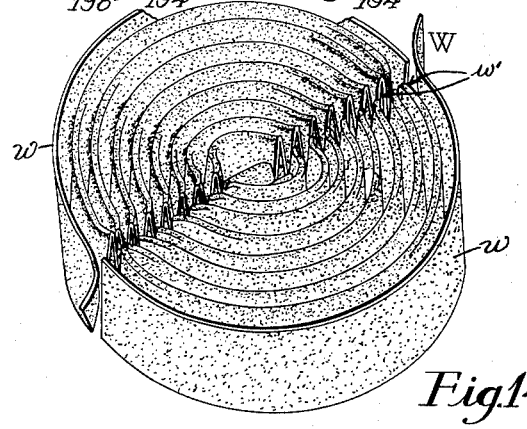
*Fig.11*
*Fig.12*
*Fig.13*
*Fig.14*
Inventors
John M. Whelton
George F. C. Burke
By their Attorney
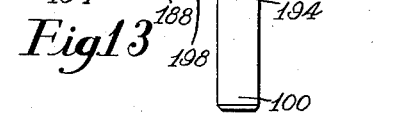

Patented Aug. 8, 1950

2,517,746

UNITED STATES PATENT OFFICE 2,517,746

COATING APPARATUS FOR FILTER SECTIONS

John M. Whelton, Peabody, and George F. C. Burke, Fairhaven, Mass., assignors to United Shoe Machinery Corporation, Flemington, N. J., a corporation of New Jersey Application February 4, 1946, Serial No. 645,416

17 Claims. (Cl. 91—50)

This invention relates to apparatus by which a coating of cement or other adhesive may be applied to work-pieces which are to be joined, it being herein disclosed as utilized for coating opposite sections of filters for use in gas-masks.

In work of the character above mentioned the integrity of the filter, and therefore its utility in preventing the passage of gas, is dependent upon the perfection of the joint between the two sections. An object of our invention is to insure the application to the filter-sections, or other surfaces to be joined, of an ample coating of the adhesive, so distributed that the more critical points will receive a greater quantity of the adhesive than other portions, this being accomplished by an apparatus which is simple, reliable and easily operated. In the attainment of this object, we combine with a work-support and adhesive-supplying means, an adhesive-applying member mounted to move both in opposite directions between the supplying means and work-support and in opposite directions across the surface to be coated. At least one of these movements best occurs from a point spaced from one edge of the work. By this arrangement, the adhesive may be taken from the supplying means and not only applied in two coats to the work, but, at the initial points of contact with said work, applied more thickly to increase the security of the connection. Since this movement of the applying member is preferably produced directly by the operator, to insure that they occur in the proper order, there is means for preventing each of these opposite movements while the other opposite movement is taking place. In order that both work-coating movements shall place upon the work the proper quantity of the adhesive, the applying member is moved, after its travel in one direction across the work, to make effective a fresh applying surface before its movement in the opposite direction. The two applying movements of the applying member are herein shown as obtained by mounting the applying member upon an oscillatory carrier, which is, in turn, movable upon a reciprocatory carrier, and the movement of the applying member to present to the work an unused portion of the adhesive is effected during the reciprocation of the carrier. In the preferred embodiment of the invention, the applying member is in the form of a roll rotatable on an arm pivoted for oscillation upon a carrier, which is reciprocable upon a relatively stationary frame member. In its oscillation, the applying roll is shifted between a rotatable cement-supplying roll and an applying position, and in the latter position the reciprocation of the carrier causes the applying movement of the roll. When the applying roll is in coöperation with the supply-roll, it receives rotation therefrom, as through intermeshing gearing, so there is distributed about it a complete coating of cement. It the reciprocation, the applying roll is rotated after the first coating action sufficiently to bring into effective position an unused cement-bearing surface. This rotation may be accomplished by a ratchet-wheel rotatable upon the arm, said wheel being geared to the applying roll and actuated by engagement with a pawl carried by the frame member. Two surfaces upon the arm may, respectively, coöperate with surfaces on the frame member to confine the oscillatory and reciprocatory movements of the arm to the chosen directions. To establish the correct relation between the applying roll and the supply-roll, the angular positions of the axes of both rolls are variable, as is the extent of movement of the applying roll at the supply-roll and at the work.

In the accompanying drawings, illustrating one of the several possible embodiments of the invention:

Fig. 1 is a perspective view of our improved coating apparatus, viewed from the rear;

Fig. 2, a vertical transverse section through the cement-supplying roll and more closely associated parts;

Fig. 3, a rear elevation of said roll;

Fig. 4, a diagrammatic section illustrating the means for rotating the applying roll in coöperation with the supply-roll;

Fig. 5, an enlarged broken rear elevation of the applying roll and its mounting;

Fig. 6, a fragmentary top plan view of the contact-block, which determines the forward position of the applying roll;

Fig. 7, a side elevation of the carrier-arm for the applying roll with its supporting means, looking from the right in Fig. 5, the roll being in position preparatory to the application of the first coating to the work;

Fig. 8, an enlarged perspective view of the stop-block by which the movement of the carrier-arm toward the work is limited;

Fig. 9, an enlarged side elevation illustrating the initial engagement of the carrier-arm with the contact-block of Fig. 6;

Fig. 10, a rear elevation of the guide means for the mounting of the carrier-arm;

Fig. 11, a fragmentary view, in side elevation, showing the applying roll positioned for its downward coating movement;

Fig. 12, a view similar to Fig. 7, with the applying roll in its position after the first coating of the work;

Fig. 13, a like view, with the applying roll rotated in preparation for its second coating movement; and Fig. 14, a perspective of the cooperating sections of a sample of the completed work.

Situated in operating position above a table 20, and held in position by a work-support S in a manner not important for the purposes of this invention, is a work-piece w (Fig. 1) to the vertical face of which cement or other adhesive is to be applied. This piece may be one-half of a circular filter W (Fig. 14) of paper or other material folded into corrugations, the coated diametric surfaces w' of which are to be joined by the cement. A portion 22 of the table projects rearwardly, it being supported by a post 24. Attached to the outer extremity of the portion 22 by screws 25 passing through over-size openings (Fig. 2) is the frame 26 of a cement-supplying mechanism A. Rising from the rear of this frame is a standard 28, to the upper end of which is attached a holder 30 for an inverted cement-container 32, which may be of the usual valved type, this arrangement furnishing a barometric feed. The holder and container are variable together between an upper level, determined by a collar 34 fast upon the standard, and a lower level, determined by a second fixed collar 36, the two collars contacting with opposite surfaces upon the frame 26. A set-screw 38, threaded through the frame and engaging the standard, secures the holder in place. Shown as formed integral with the frame is a trough 40 receiving cement from the holder 30 through a flexible conduit 42. When the holder and container are raised, as appears in Fig. 1, the cement flows from it through the conduit into the trough to rise to the desired height. When the mechanism supplied is not in use, the trough may be emptied by loosening the set-screw 38 and lowering the standard until the collar 36 rests upon the frame. Under these conditions, the cement in the trough returns to the holder, and, with the container removed, the entire contents of the holder may be drawn off through a cock 44.

In opposite sides of the frame 26 above the trough 40 are bearings for a rotatable cement-supplying roll 46, its lower portion turning in the cement. In one bearing a short shaft 48 is rotatable (Fig. 3), it being driven by a pulley 50 and belt 51 from a source of power. The belt may be guided by pulleys 52, 52 (Fig. 1), rotatable on a bracket 53 secured to the frame 26 by slot-and-screw connections 54, through which the tension of the belt may be varied. The adjacent hub of the roll is connected to an enlargement upon the shaft by a meshing projection and depression 55. In the hub at the opposite extremity of the roll is a conical depression to receive the complemental end of a spindle 56. The spindle may be secured at an inner work-supporting position by a set-screw 58 threaded through the frame-wall or, when this is loosened, withdrawn through a finger-piece 60, to an extent limited by a groove 62 in the spindle. Drip-flanges 64 surrounding the hubs of the roll prevent the cement from flowing outwardly from above the trough and into the bearings. To produce a uniform coating of cement upon the supply-roll, there is movable upon an inwardly and upwardly inclined surface 66 of the trough a doctor-blade 68, secured in place by clamping screws 70 passing through slots in the blade and threaded into the trough-wall. The relation of the inner end of the blade to the periphery of the roll is determined by screws 72, 72, threaded into the trough below the surface 66 and extending through a flange depending from the outer extremity of the blade. Expansion springs 74 maintain the flange yieldably against the heads of the screws, to follow these when the blade is adjusted away from the roll.

Cement for application to the work is taken from the periphery of the supply-roll 46, as it rotates, by a roll 80, which is rotatable about its axis, and, further, has an oscillatory movement of translation between the supply-roll and the work w, i. e., from adhesive-receiving to adhesive-applying position, and also a vertical movement in engagement with said work. As is best illustrated in Fig. 5, the applying roll 80 has a pocketed or otherwise roughened surface and is rotatable in spaced portions 82, 82 of the end-section 84 of a carrier-arm 86. The mounting of the roll in its bearings and the disposing of the outwardly flowing cement may be similar to what has already been described for the supply-roll 46. The main arm-section 86 is mounted to oscillate about an axis, indicated at 88, upon a bracket 90 depending from the table 20 adjacent to the portion 22 and fastened to said table by screws 92 passing through over-size openings in a horizontal flange of the bracket. This attachment provides for the angular adjustment of the applying roll to bring its cement-carrying surface into parallelism with the work-surface w' to be coated. By adjustment of the position of the supply-roll 46 through the frame-clamping screws 25, a similar relation between said roll and the roll 80 may be established. The arm-section 86 first extends upwardly and inwardly toward the supplying mechanism and then upwardly and outwardly toward the work. On this latter portion the end-section 84 is secured by a clamping screw 96, permitting angular adjustment (Fig. 7).

Upon the rear face of the bracket 90 are spaced lugs 98, 98 (Fig. 5) through which are alined vertical openings. These openings guide a carrier-rod 100 fast in a vertical bore through a lug 102 upon the outer side of a horizontal carrier-sleeve 104. As the rod 100 is moved bodily in the lugs 98 of the bracket, it is prevented from turning about its longitudinal axis by a forwardly projecting horizontal arm 106 (Figs. 7 and 10) guided for vertical movement between a forward extension 108 of the bracket 90 and a bar 110 attached to and spaced from the extension. A rod 112, extending downwardly from the end of the arm to an unillustrated treadle, enables the operator to lower the elements 100 and 104, and the parts which they carry, these being held normally raised by a tension spring 114 joining the rod to the table 20. Situated within the sleeve 104 is a bushing 116, to which is secured by a set-screw 118 the hub 120 of the arm 86. The opposite end of the bushing is surrounded by a lateral extension 122 from the arm. This mounting of the arm permits it to oscillate about the axis 88 to carry the applying roll 80 between the supply-roll 46 and the work w to transfer cement from the former to the latter, while the vertical movement of the carrier-rod 100 in the bracket-lugs 98 makes possible the travel of the applying roll over the work-surface w' to be coated. The first of these movements may be produced by a handle 124 upon the arm-section 84 manipulated by the operator; the second, by the treadle-rod 112 and its spring 114. To cause the extent of oscillation of the roll 80 to bring it into the vertical plane of the work-surface to be coated, the arm 86 carries a stop screw 130 (Figs. 7 and 8) which may be varied in its projection from the arm. This screw contacts with a vertical surface 132 on a stop-bracket 134 fastened to the under side of the table 20. In the vertical travel of the arm and roll, the end of the stop-screw may move up and down the surface 132. The limits of this vertical travel may be determined, respectively, by contact of the hub of the arm 106 with the upper bracket-lug 98 (Fig. 7) and the contact of the lug 102 of the carrier-sleeve with the lower bracket-lug (Fig. 13). In the oscillation of the arm, which occurs in the raised position of the roll 80, it is retained against depression by the treadle-rod 112, by an arcuate surface 136 on the lower edge of a downward extension 138 from the arm 86 (Fig. 9). At this time, the surface 136 moves over an opposing horizontal surface 140 situated at the top of a contact-block 142, secured by a screw 144 to the outer side of a projection 146 from the adjacent edge of the bracket 90 (Figs. 5 and 6). An intermeshing vertical projection and depression 145 of the block 142 and bracket-projection 146 hold the block against lateral displacement. To bring the surface 140 of the block to the correct relation to the extension-surface 136, the screw 144 passes into the bracket through an over-size opening, so the block has a capacity for limited vertical adjustment. When the carrier-arm is moved out to place the roll 80 in its applying position, the inner edge of the surface 136 clears the outer edge of the surface 140. At this time, the carrier-arm may be lowered by the depression of the treadle-rod 112, a surface 148 upon the arm-extension sliding over the opposed surface 150 of the block 142 (Figs. 12 and 13) and maintaining the arm against oscillation.

When the applying roll 80 is at the constantly rotating supply-roll 46, as appears in Fig. 4, its extent of movement being determined by the contact of a screw 152 in the carrier-arm-section 84 with a surface of the trough, it is rotated to receive a uniform peripheral coating of cement. On leaving the supply-roll, this rotation of the applying roll stops, so the angular relation of its periphery may be independently controlled at the work. On the shaft 48 of the supply-roll, a gear 160 is fast, so it is in constant rotation. From a bracket 162 extending from the trough 40, a spindle 164 projects horizontally, and upon this turn together a pinion 166 meshing with the gear and a pinion 168. These two pinions rotate constantly. When the operator brings the applying roll against the supply-roll, a pinion 170, secured to turn with the applying roll, comes into mesh with the pinion 168 to rotate the applying roll oppositely to the supply-roll. The applying roll, therefore, receives its coating as long as it is in its inner position.

When the applying roll 80 is shifted outwardly by the handle 124, it reaches a point above the level of the work, and, for reasons which will later be stated more fully, first applies a coating to it by downward movement and then a second coating by upward movement. It is desirable to present to the work upon the latter travel a portion of the applying surface different from that which has just been effective. This is accomplished during downward movement of the applying roll after it has left the work. Rotatable in the bushing 116 and projecting therefrom is a shaft 176 (Fig. 5), upon one projecting end of which a pulley 178 is fast. A belt 180 operates over this pulley and over guide-pulleys 182, 182 rotatable on the arm 86, and a pulley 184 turning with the pinion 170 and applying roll 80. To the end of the shaft 176 opposite the pulley 178 a ratchet-wheel 186 is secured. At the edge of the bracket 90 opposite its projection 146 is a projection 188 (Figs. 5 and 7) to which is adjustably attached a block 190 by a screw 192 passing through an over-size opening in the block and threaded into the projection. Through a flange at the lower outer edge of the projection are threaded vertical spaced screws 194, 194 upon which the bottom of the block rests. These, with the motion permitted by the screw 192, provide for the adjustment and retention of the block in different vertical and angular positions. Pivoted upon the block is a pawl 196, its point being urged inwardly by a spring-plunger 198, movable in the block, toward the plane in which the axis 88 travels in the vertical movement of the carrier-arm and applying roll. A stop-screw 200 carried by the pawl, with its end contacting with a vertical surface of the block, adjustably determines the location of the point of the pawl. This position of the pawl, together with that resulting from the adjustment of the block 190, is such that first, after the roll 80 has acted upon and passed the surface of the work to which it has applied a coating of cement, a tooth of the ratchet-wheel 186 engages the point of the pawl (Fig. 12). The shaft 176 is thereby rotated, this motion being transmitted to the applying roll 80 through the belt 180. The rotation of the roll is sufficient to bring into the plane of the work-face w' a peripheral portion of the roll adjacent to that which acted during the downward travel and which bears an unused coating of cement. During the upward travel of the roll, at which time this fresh surface is utilized to again coat the work, the ratchet passes the pawl without being rotated, the plunger 198 yielding.

In the use of this coating apparatus, the axis of the applying roll 80 may be brought into parallelism with the surface w' to be coated, such as that at the diameter of a filter-section w, by the adjustment at 92 of the frame-bracket 90, while parallelism between the axis of the applying roll and the supply-roll 46 may be established by the adjustment at 25 of the supply mechanism A. The time at which the applying roll is rotated by the engagement of the ratchet-wheel 186 with the pawl 196, and the extent of such rotation, are determined by the positions of the screws 194 and 200. Cement is supplied from the container 32 to the trough 40, rising to the level therein fixed by the vertical adjustment of the standard 28. The supply-roll 46, in its constant rotation, raises upon its periphery a covering of cement from the trough, and into this covering the periphery of the roll 80 extends to a depth permitted by the contact with the trough-wall of the screw 152 in the roll-carrying arm 84, 86 in its normal position. The applying roll is in rotation, because its pinion 170 is in mesh with the pinion 168 rotatable with the supply-roll, so its entire periphery bears a coating c of cement. A filter-section w being in place upon the support S, the operator, grasping the handle 124, swings the carrier-arm outwardly until the screw 130 engages the contact-surface 132 of the bracket 134. During this travel of the roll, its arrival at the correct level with reference to the work is made certain by engagement between the surfaces 136 and 140 of the carrier-arm and frame-bracket 108 respectively. The applying roll is now located as appears in Fig. 7, an element of its outer peripheral surface lying above the upper edge of the work-surface w'. This elevated position of the roll is due to the action of the spring 114 on the carrier-sleeve 104 of the carrier-arm 84, 86, as limited by the engagement of the arm 106 with the upper lug 98 of the frame-bracket. Then, by depression of the treadle, the operator lowers the rod 112, and therefore the carrier-sleeve and arm and the applying roll. As will be observed in Fig. 11, the coating c of cement upon the applying roll extends slightly over the upper surface of the work-section w, while the surface w' is substantially tangent to the periphery of the roll. Therefore, as the roll descends from the level shown in Fig. 11 to that of Fig. 12, there will first be a bead b of the cement deposited along the upper edge of the surface w'. In a filter, this lies at the points of the corrugations, where leaks are most liable to occur. At this time, the roll resists a tendency to be rotated by engagement with the surface. When, however, the periphery of the roll comes into full contact with the work-surface, it is turned contraclockwise about its axis by the frictional engagement and will apply to the surface a uniform coating B of the adhesive. This is completed when the roll has reached the level shown in Fig. 12. In this lowering of the roll, its axis is held in the proper vertical plane by engagement between the surfaces 148 and 150 of the carrier-arm and frame-bracket respectively. There will largely have been removed from the roll the cement over the arc of contact indicated at c'. After this first coating of the work-surface, and as the applying roll leaves it and descends until the carrier-lug 102 reaches the lower frame-lug 98, a tooth of the descending ratchet-wheel 186 engages the point of the pawl 196. Through the intermediate belt-gearing, the applying roll is rotated clockwise through a predetermined arc to bring an undisturbed area of cement c upon its periphery into an effective position (Fig. 13). With the handle 124 still held in, the operator releases the treadle, so the spring 114 raises the carrier-sleeve 104 with the carrier-arm 84, 86 and the applying roll 80. The coating operation just described is thereby repeated in the reverse direction, an extended bead first being laid along the lower edge of the surface w', and finally a second coat being applied to said surface to furnish an adequate increased layer at B. In this upward movement, the pawl 196 yields, so the ratchet-wheel 186 is ineffective. It will be seen that not only is there applied by the apparatus of this invention an ample unbroken coating to the entire surface to be joined, but that, at the more critical points, the cement is so built up that these will be most effectively sealed.

Having thus described our invention, what we claim as new and desire to secure by Letters Patent of the United States is:

1. In a coating apparatus, a work-support, means for supplying an adhesive, an adhesive-applying member, an oscillatory carrier for the applying member by which it is moved between the supplying means and the work, and a reciprocatory carrier for the oscillatory carrier by which the applying member is thereafter moved in a different direction across the work-surface to be coated.

2. In a coating apparatus, a work-support, means for supplying an adhesive, an adhesive-applying member, an oscillatory carrier for the applying member by which it is moved between the supplying means and the work, a reciprocatory carrier for the oscillatory carrier by which the applying member is moved across the work-surface to be coated, stopping means movable with the oscillatory carrier, and an element fixed relatively to the oscillatory carrier in cooperation therewith and arranged to prevent either the movement of oscillation or reciprocation while the other movement of reciprocation or oscillation is taking place.

3. In a coating apparatus, a work-support, means for supplying an adhesive, an adhesive-applying member, an oscillatory carrier for the applying member, a handle upon the oscillatory carrier by manipulation of which the applying member is shifted in one plane between the supplying means and the work, a reciprocatory carrier for the oscillatory carrier, and a treadle-connection to the reciprocatory carrier to move the applying member in another plane back and forth across the work-surface to be coated.

4. In a coating apparatus, a work-support, means for supplying an adhesive, an adhesive-applying member mounted to move both in opposite directions between the supplying means and work-support and in opposite directions across the work-surface to be coated, and means for moving the applying member after its travel in one direction across the work-surface to make effective a fresh applying surface before movement in the opposite direction across said work-surface.

5. In a coating apparatus, a work-support, means for supplying an adhesive, an adhesive-applying member, an oscillatory carrier for the applying member by which it is moved between the supplying means and the work, a reciprocatory carrier for the oscillatory carrier by which the applying member is moved across the work-surface to be coated, and means acting during the reciprocation of the carrier for making effective a fresh applying surface.

6. In a cementing apparatus, a rotatable cement-supplying roll, a reciprocatory carrier, an arm pivoted upon the carrier, a cement-applying roll rotatable upon the arm, means arranged to oscillate the arm to shift the applying roll in one direction between the supply-roll and an applying position, and means arranged thereafter to reciprocate the carrier in another direction to impart to the applying roll its applying movement.

7. In a cementing apparatus, a rotatable cement-supplying roll, a reciprocatory carrier, an arm pivoted upon the carrier, a cement-applying roll rotatable upon the arm, means arranged to oscillate the arm to shift the applying roll in one plane between the supply-roll and an initial position spaced from one edge of the work, and means arranged thereafter to reciprocate the carrier in another plane to impart to the applying roll movement across the work-surface to be coated to a point spaced from the opposite edge of the work and then back to the initial point.

8. In a cementing apparatus, a rotatable cement-supplying roll, a reciprocatory carrier, an arm pivoted upon the carrier, a cement-applying roll rotatable upon the arm, means arranged to oscillate the arm in one direction to shift the applying roll between the supply-roll and an applying position, means arranged to limit variably the movement of the arm in the opposite positions of the applying roll, and means arranged thereafter to reciprocate the carrier in another direction to impart to the applying roll its applying movement.

9. In a cementing apparatus, a rotatable cement-supplying roll, a reciprocatory carrier, an arm pivoted upon the carrier, a cement-applying roll rotatable upon the arm, means arranged to vary independently of each other the angles of the axes of the supply-roll and applying roll, means arranged to oscillate the arm to shift the applying roll between the supply-roll and an applying position, and means arranged to reciprocate the carrier to impart to the applying roll its applying movement.

10. In a cementing apparatus, a rotatable cement-supplying roll, a reciprocatory carrier, an arm pivoted upon the carrier, a cement-applying roll rotatable upon the arm, means arranged to oscillate the arm to shift the applying roll between the supply-roll and an applying position, means for transmitting the rotation of the supply-roll to the applying roll when said applying roll is in a position to receive cement from the supply-roll, and means arranged to reciprocate the carrier to impart to the applying roll its applying movement.

11. In a cementing apparatus, a rotatable cement-supplying roll, a gear rotatable with the supply-roll, means for rotating the roll and gear, a reciprocatory carrier, an arm pivoted upon the carrier, a cement-applying roll rotatable upon the arm, a gear secured to rotate with the applying roll, means arranged to oscillate the arm to shift the applying roll between the supply-roll and an applying position and to carry its gear into mesh with that of the supply-roll, and means arranged to reciprocate the carrier to impart to the applying roll its applying movement.

12. In a cementing apparatus, a rotatable cement-supplying roll, a reciprocatory carrier, an arm pivoted upon the carrier, a cement-applying roll rotatable upon the arm, means arranged to oscillate the arm to shift the applying roll between the supply-roll and an applying position, means arranged to reciprocate the carrier to impart to the applying roll its applying movement, a ratchet-wheel rotatable about the axis of oscillation of the arm, driving connections for transmitting rotation of the ratchet-wheel to the applying roll, and a pawl by engagement with which the ratchet-wheel is rotated during the reciprocation of the carrier.

13. In a cementing apparatus, a rotatable cement-supplying roll, a reciprocatory carrier, an arm pivoted upon the carrier, a cement-applying roll rotatable upon the arm, means arranged to oscillate the arm to shift the applying roll between the supply-roll and an applying position, means arranged to reciprocate the carrier to impart to the applying roll its applying movement, a ratchet-wheel rotatable about the axis of oscillation of the arm, driving connections for transmitting rotation of the ratchet-wheel to the applying roll, a pawl by engagement with which the ratchet-wheel is rotated during the reciprocation of the carrier, and means arranged to vary the position of the pawl and thereby the time in the reciprocation of the carrier at which said pawl is engaged by the ratchet-wheel.

14. In a cementing apparatus, a work-support, a cement-supplying roll, a frame member, a support guided upon the frame member for vertical reciprocation, a carrier-arm pivoted to oscillate upon said guided support, and a cement-applying roll rotatable upon the arm and movable in its oscillation between the supply-roll and the work-support and movable in the reciprocation of the guided support in opposite directions in cooperation with the work-support.

15. In a cementing apparatus, a work-support, a cement-supplying roll, a frame member, a support guided upon the frame member for vertical reciprocation, a carrier-arm pivoted to oscillate upon said support, and a cement-applying roll rotatable upon the arm and movable in its oscillation between the supply-roll and the work-support and movable in the reciprocation of the pivotal support in opposite directions in cooperation with the work-support, the arm being provided with two surfaces respectively cooperating with surfaces upon the frame member to confine the oscillatory and reciprocatory movements of the arm to the chosen directions.

16. In a cementing apparatus, a work-support, a cement-supplying roll, a frame member, a support guided upon the frame member for vertical reciprocation, a carrier-arm pivoted to oscillate upon said support, a cement-applying roll rotatable upon the arm and movable in its oscillation between the supply-roll and the work-support and movable in the reciprocation of the pivotal support in opposite directions in cooperation with the work-support, and gears connected to and rotatable with the supply-roll and applying roll, said gears being in mesh when the applying roll is at the supply-roll.

17. In a cementing apparatus, a work-support, a cement-supplying roll, a frame member, a support guided upon the frame member for vertical reciprocation, a carrier-arm pivoted to oscillate upon said support, a cement-applying roll rotatable upon the arm and movable in its oscillation between the supply-roll and the work-support and movable in the reciprocation of the pivotal support in opposite directions in cooperation with the work-support, a shaft rotatable in the pivotal support, driving connections between the shaft and the applying roll, a ratchet-wheel fixed to the shaft, and a pawl carried by the frame member and into engagement with which the ratchet-wheel moves in the reciprocation of the pivotal support.

JOHN M. WHELTON.
GEORGE F. C. BURKE.

REFERENCES CITED

The following references are of record in the file of this patent:

UNITED STATES PATENTS

| Number | Name | Date |
|---|---|---|
| Re. 13,412 | Norton | Apr. 30, 1912 |
| 1,506,645 | Kerlin | Aug. 26, 1924 |
| 1,543,873 | Rundell | June 30, 1925 |
| 2,250,611 | Swan et al. | July 29, 1941 |